United States Patent [19]

Haddock

[11] 4,333,665
[45] Jun. 8, 1982

[54] DETACHABLE TRAILER HITCH

[76] Inventor: Paul D. Haddock, 1605 W. Knoxville, Broken Arrow, Okla. 74012

[21] Appl. No.: 184,273

[22] Filed: Sep. 5, 1980

[51] Int. Cl.³ ............................................. B60D 1/14
[52] U.S. Cl. ................................ 280/408; 280/491 E; 280/414.1
[58] Field of Search .................. 280/408, 411 R, 482, 280/414 R, 500, 491 R, 491 E

[56] References Cited

U.S. PATENT DOCUMENTS

| 1,864,781 | 6/1932 | Wells | 280/408 X |
| 3,044,646 | 7/1962 | Sperow | 280/414 X |
| 3,446,516 | 5/1969 | Modglin | 280/414 X |
| 3,463,514 | 8/1969 | Warner | 280/500 X |
| 3,822,899 | 7/1974 | Slack | 280/414 R |

Primary Examiner—Joseph F. Peters, Jr.
Assistant Examiner—Donn McGiehan
Attorney, Agent, or Firm—Head & Johnson

[57] ABSTRACT

A detachable trailer hitch adapted to be removably interposed between a pair of in-line boat trailers, or the like, and comprising a frame having a first section for connection with the trailing end of the first trailer, a second section of relatively large substantially triangular configuration for surrounding the motor of the boat carried by the first trailer, and a hitch element disposed outboard of the triangular section for removable connection with the hitch member of the second or in-line trailer.

8 Claims, 3 Drawing Figures

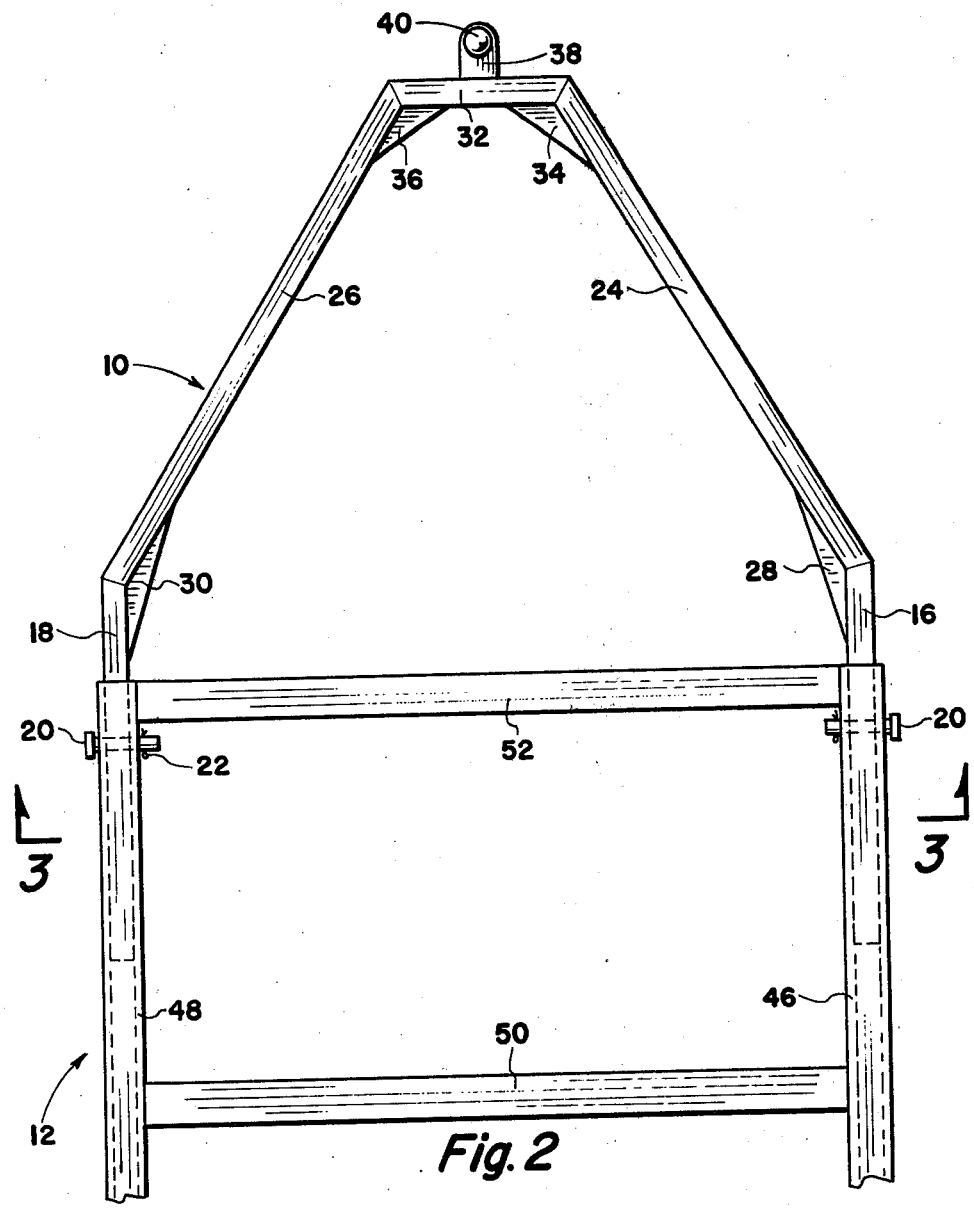
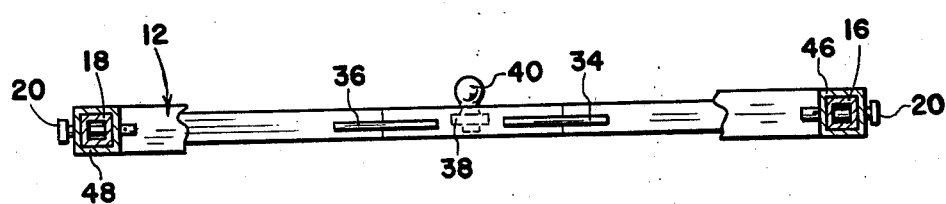
Fig. 2
Fig. 3

DETACHABLE TRAILER HITCH

BACKGROUND OF THE INVENTION

1. Field of the Invention

This invention relates to improvements in trailer hitches and more particularly, but not by way of limitation, to a detachable trailer hitch for securing two trailers in in-line or end-to-end relation behind a common towing vehicle.

2. Description of the Prior Art

With the present day scarcity of gasoline and the increased costs of fuel, many fishing and boating enthusiasts have discovered that it is much more economical and efficient to "band together" or cooperate as a group and travel to the site of the water in a single vehicle, such as a van or the like, or even in the usual passenger car. This creates a problem, however, in that it is usually desirable to have more than one boat at the lake or water source to meet the demand of the group, and the use of a single vehicle renders it difficult to move more than a single boat to the lake site. The use of the presently available trailer hitches for towing boats in tandem relation behind a single vehicle is impractical since the boat carried on each trailer normally includes the usual outboard motor suspended at the rear of the boat, which interfers with any of the available trailer hitches that might be attached to the rear of the first boat trailer.

SUMMARY OF THE INVENTION

The present invention contemplates a novel detachable trailer hitch which is particularly designed and constructed for overcoming the foregoing disadvantages. The novel trailer hitch comprises a frame having a first section for engagement with the trailing portion of the leading boat trailer for removable connection therewith a second frame section of substantially triangular configuration and sufficiently large for encasing or surrounding the motor of the boat carried by the first or leading trailer, and a hitch or connection means disposed outboard of the rectangular section for removable connection with the hitch means of the in-line or trailing trailer. In this manner, at least two in-line trailers may be secured behind a common towing vehicle for movement therewith in tandem relation. When the vehicle arrives at the destination, or lakeside, the second or trailing boat trailer may be disconnected or unhitched from the novel trailer hitch, and the disconnected trailer and boat thereon may be temporarily disregarded. The novel trailer hitch may then be removed from connection with the leading or first trailer frame, whereupon the boat carried by the first trailer may be launched into the water in the usual manner. The first trailer may then be removed from connection with the towing vehicle and the second trailer may be secured to the vehicle in lieu thereof, whereupon the boat carried by the second trailer may then be launched into the water from its own trailer in the usual launching manner. The novel trailer hitch is simple and efficient in operation and economical and durable in construction.

BRIEF DESCRIPTION OF THE DRAWINGS

FIG. 2 is a plan view of a trailer hitch embodying the invention and shown as connected with the trailing portion of a trailer frame.

FIG. 3 is a view taken on line 3—3 of FIG. 2, with a portion broken away for purposes of illustration.

DESCRIPTION OF THE PREFERRED EMBODIMENT

Figure 1:
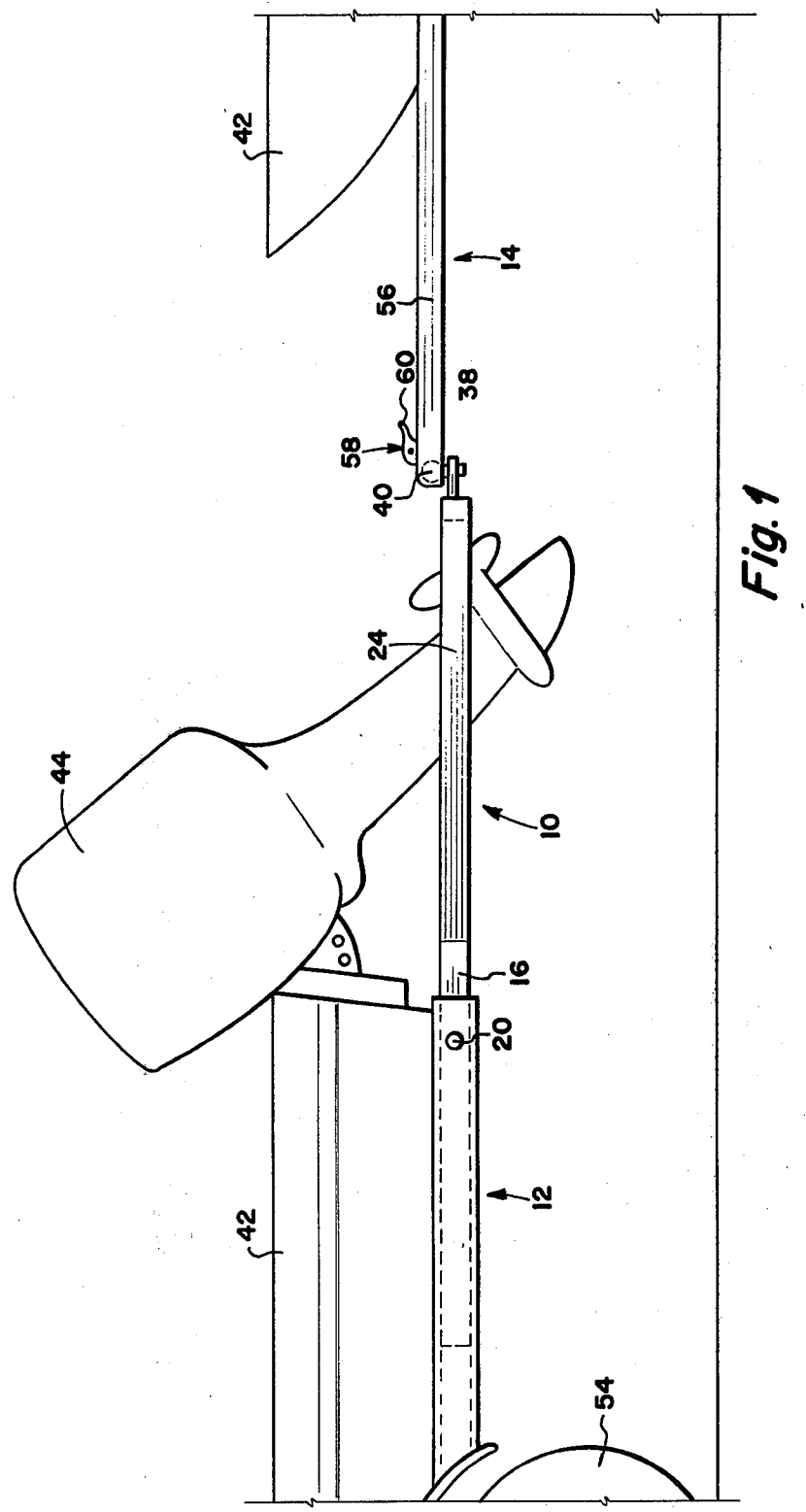
FIG. 1 is a side elevational view of a trailer hitch embodying the invention and depicted as secured between a pair of tandem or in-line boat trailers.

Referring to the drawings in detail, reference character 10 generally indicates a trailer hitch adapted to be removably secured between a pair of in-line or tandem trailer frames 12 and 14. The trailer hitch 10 comprises a pair of spaced mutually parallel arms or frame members 16 and 18 having the outer ends thereof unencumbered for ease of connection with the trailer frame 12 as will be hereinafter set forth. The arms 16 and 18 are preferably constructed from a suitable tubing having a substantially square cross-sectional configuration as particularly shown in FIG. 3, but not limited thereto, and are each provided with a bore (not shown) extending therethrough for receiving a bolt 20 therethrough for removably securing the hitch 10 to the trailer 12. Of course, the bolts 20 may be removably secured in position through the arms 16 and 18 in any suitable manner, such as by cotter pins 22, or the like.

The opposite ends of the arms 16 and 18 are welded or otherwise secured to angularly orientated frame elements 24 and 26, respectively, which extend inwardly or diverge in directions toward each other as particularly shown in FIG. 2, thus forming an open frame of substantially triangular configuration outboard of the arms 16 and 18. As a practical matter it is preferable to provide a gusset 28, or the like, at the juncture between the arm 16 and frame element 24 for strengthening of the joint therebetween, and a similar gusset 30 is preferably secured at the juncture between the arm 18 and frame element 26. The outer ends of the frame elements 24 and 26 are connected or secured together by a cross bar 32, and it is preferable to provide gussets or plates 34 and 36 at the opposite ends of the bar 32 for strengthing the connection thereof with the elements 24 and 26, as is well known. An outwardly extending substantially centrally disposed flange or tongue member 38 is welded or otherwise secured to the cross bar member 32 and a suitable ball hitch member 40, or the like, is secured to the flange 38 and extends outwardly therefrom for connection with the trailer frame 14 in a manner as will be hereinafter set forth.

The trailers 12 and 14 are usually substantially identical and may be of any suitable type normally utilized for supporting a boat 42 having the usual outboard motor 44 secured thereto. The trailers 12 and 14 normally comprises a pair of spaced side frame members 46 and 48 disposed in substantially parallel relationship and spaced apart by cross members 50 and 52. The side frame members 46 and 48 are usually constructed from a tubing of square cross-sectional configuration, as shown in FIG. 3, and the outer end of each frame member 46 and 48 is normally open. The frame members 46 and 48 are usually the rear or trailing end of the trailer 12, and extend rearwardly from the usual support wheels 54 (only one of which is shown in FIG. 1). The leading or forward end of each trailer 12 and 14 is normally provided with inwardly diverging frame elements 56 (only one of which is shown herein), and the forward ends of the frame elements 56 are normally provided with a hitch socket means generally indicated at 58 in FIG. 1. The hitch socket means 58 normally comprises a recess (not shown) of substantially spherical configuration for receiving a ball hitch member, such as the hitch member 40, therein and a suitable pivotal locking element 60 which releasably secures the ball within the socket. When it is desired to connect the trailers 12 and 14 in tandem or in-line relationship whereby the trailer 12 will be considered the leading trailer and the trailer 14 will be considered the trailing trailer, the hitch assembly or apparatus 10 may be removably or detachable connected between the trailers 12 and 14 in the manner as will be hereinafter set forth.

Prior to connection of the hitch apparatus 10 with the trailer 12, it is necessary to provide a pair of substantially axially aligned bores (not shown) in the side frame members 46 and 48 which may be aligned with the bores of the arm member 16 and 18 during the connection of the hitch therewith. The outer dimensions of the arm members 16 and 18 of the hitch 10 are preferably slightly less than the internal dimensions of the side frame members 46 and 48, respectively, of the trailer 12 whereby the free ends of the arms 16 and 18 may be slidably inserted through the open outer ends of the frame members 46 and 48 for providing a telescopic relationship therewith. The arms 16 and 18 may be positioned within the respective frame members 46 and 48 in such a manner that the bores of the elements are in alignment whereby the bolts 20 may be inserted through the associated arms 16 and 18 and respective frame elements 46 and 48 as shown in the drawings. The bolts or studs 20 may be removably secured in position by the cotter pins 22, or the like, thus securing the hitch apparatus 10 to the trailing end of the leading trailer 12. The relative position of the bores and locking bolts is selected whereby the position of the rectangular frame portion formed by the angularly extending arms 24 and 26 is disposed in such a manner as to receive the outboard motor 44 therein. The triangular frame portion surrounds the outer periphery of the motor 44 in a substantially horizontal plane for precluding interference between the motor and the hitch apparatus.

The hitch socket means 58 of the trailing trailer 14 may be connected with the ball hitch member 40 of the hitch apparatus 10 in the usual manner, thus securing the trailer 14 in a tandem relation with respect to the trailer 12. The forwardly disposed hitch socket means 58 of the leading trailer 12 may be connected with the usual hitch ball means (not shown) normally provided on the towing vehicle (not shown), and the boats 42 secured or disposed on the two in-line boat trailers 12 and 14 may be towed behind the vehicle simultaneously.

When the towing vehicles and trailers 12 and 14 have arrived at the desired destination, and it is necessary to launch the boat in a lake, or the like, the trailing trailer 14 may be disconnected from the hitch apparatus 10 by disconnecting the hitch socket means 58 from the ball hitch 40 in the usual manner. The disconnected trailer 14 and boat 42 carried thereby may be left in this disconnected position and disregarded for the moment. The bolts or studs 20 may then be removed from the aligned bores of the arms 16 and 18 and the frame members 46 and 48, and the arms 16 and 18 may be withdrawn from the members 46 and 48, thus disconnecting the hitch apparatus 10 from the leading trailer 12. The boat 42 supported by or carried by the trailer 12 may be launched from the trailer 12 in the usual manner.

Subsequent to the launching of the boat 42 from the leading trailer 12, the leading trailer 12 may be disconnected from the towing vehicle and the trailer 14 may be secured thereto in lieu of the trailer 12, and in the usual manner. The boat 42 carried by the trailer 14 may then be launched from its own trailer in the usual or well known manner.

Of course, when the boats 42 are to be once again disposed on the respective trailers 12 and 14, the boat carried by the trailer 14 may be loaded thereon in the normal manner, and the loaded trailer 14 may be unhitched or disconnected from the towing vehicle. The first trailer 12 may then be connected with the towing vehicle in the usual manner and the boat 42 to be carried by the trailer 12 may be loaded thereon in the well known manner. Subsequent to the loading of the boat 42 onto the trailer 12, the hitch apparatus 10 may be secured between the trailers 12 and 14 as hereinbefore set forth, and the loaded trailers may then be towed in the tandem relation.

From the foregoing it will be apparent that the present invention provides a novel detachable trailer hitch which may be interposed between a pair of in-line or tandem boat trailers, or the like, for facilitating transporting of the two trailers simultaneously behind a single towing vehicle. The novel hitch apparatus comprises spaced connection arms for removable engagement with the trailing end of the leading trailer, and inwardly diverging frame members forming a triangular box-like area for surrounding the outboard motor disposed on or carried by the leading trailer. The hitch apparatus is further provided with a hitch connection element disposed outboard of the triangular section, said hitch connection element being adapted for removable connection with the hitch means for the trailing trailer, thus securing the two trailer in an in-line or tandem relationship for towing by a common vehicle.

Whereas the present invention has been described in particular relation to the drawings attached hereto, it should be understood that other and further modifications, apart form those shown or suggested herein may be made within the spirit and scope of this invention.

What is claimed is:

1. In combination with at least two trailers, a detachable trailer hitch apparatus for connecting trailers in spaced tandem relation, said hitch apparatus comprising frame means having a connection section for engagement with the trailing end of one of said trailers, means cooperating between the connection section and the said trailing end for removably connecting the hitch apparatus to said one trailer, inwardly diverging frame means extending outwardly from said connection section in a direction away from said one trailer, and hitch means disposed outboard of said diverging frame means for removable connection with the leading end of the other of said trailers for connecting the trailers in said spaced tandem relation.

2. A detachable trailer hitch apparatus as set forth in claim 1 wherein the connection section comprises a pair of spaced substantially mutually parallel arm members slidably engageable with the said trailing end of the said one trailer.

3. A detachable trailer hitch apparatus set forth in claim 2 wherein one end of each of said arm members is unencumbered for facilitating connection with said one trailer.

4. A detachable trailer hitch apparatus as set forth in claim 3 wherein the opposite end of each of said arm members is secured to the diverging frame means, and reinforcing means is provided at the juncture between the arm members and diverging frame means.

5. A detachable trailer hitch apparatus as set forth in claim 4 wherein the diverging frame means comprises a pair of frame members each having one end secured to a respective arm member and extending outwardly therefrom at an angular orientation toward one another, and cross bar means secured between the outer ends of the frame members.

6. A detachable trailer hitch apparatus as set forth in claim 5 wherein the hitch means is secured to said cross bar means.

7. A detachable trailer hitch apparatus as set forth in claim 6 wherein the hitch means comprises flange means secured to the cross bar means and extending outwardly therefrom in a direction away from said angular frame members, and ball means secured to the flange means for removable connection with said other trailer.

8. A detachable trailer hitch apparatus set forth in claim 1 wherein the two trailers each have a boat with an outboard motor supported therein, and said diverging frame means provides an open area of substantially triangular configuration for receiving the outboard motor of the said other trailer therein.

* * * * *